(No Model.)
S. B. CUNNINGHAM.
CULTIVATOR.
No. 390,007. Patented Sept. 25, 1888.
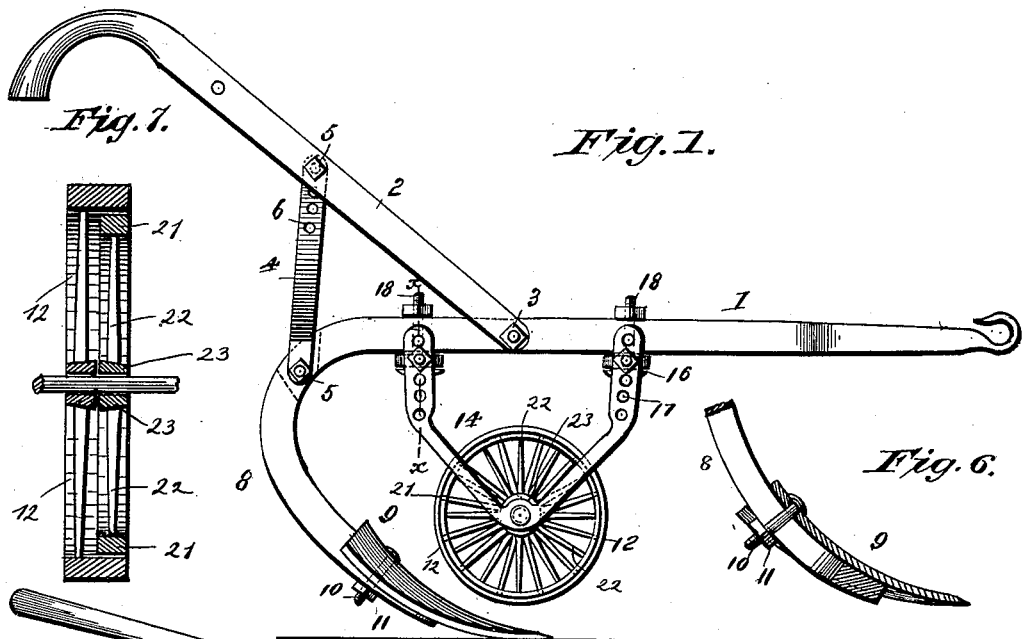
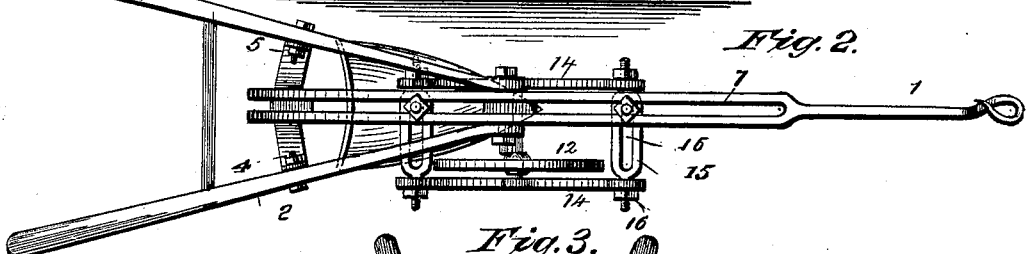
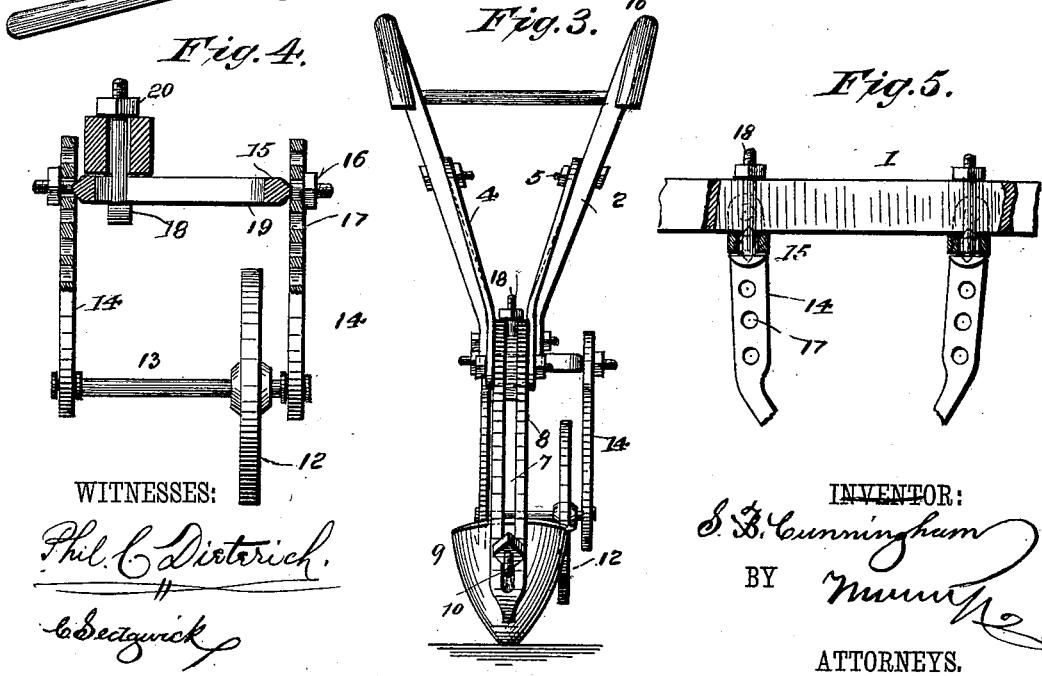
WITNESSES:
Phil. C. Dieterich.
C. Sedgwick
INVENTOR:
S. B. Cunningham
BY
ATTORNEYS.

UNITED STATES PATENT OFFICE.

SAMUEL B. CUNNINGHAM, OF IUKA, ARKANSAS.

CULTIVATOR.

SPECIFICATION forming part of Letters Patent No. 390,007, dated September 25, 1888.

Application filed November 26, 1887. Serial No. 256,214. (No model.)

*To all whom it may concern:*

Be it known that I, SAMUEL BRAINARD CUNNINGHAM, of Iuka, in the county of Baxter and State of Arkansas, have invented new and useful Improvements in Cultivators, of which the following is a full, clear, and exact description.

This invention relates to an improvement in cultivators, and has for its object to provide a cultivator so constructed that it may be used in cultivating young crops, and that the parts thereof will be adjustable, so as to be used for double or single plows and to regulate and plow close to each side of a row.

The invention consists in a cultivator constructed and arranged as hereinafter described and claimed.

Reference is to be had to the accompanying drawings, forming a part of this specification, in which similar figures of reference indicate corresponding parts in all the views.

Figure 1 is a side view of the cultivator in position for use as a single plow. Fig. 2 is a plan view thereof. Fig. 3 is a rear view thereof. Fig. 4 is a detail view in section on the line $x\ x$ of Fig. 1. Fig. 5 is a detail view of a regulator-wheel attachment with parts broken away. Fig. 6 is a detail view showing the plowshare in section and the plow-beam broken away, and Fig. 7 is a detail view of the fender-wheel.

In cultivating a crop after it is up and so small that it cannot be closely approached with a common plow without covering it up, it has been found necessary to provide a plow so constructed as to plow up to the row on both sides without covering up the crop. For this purpose I have constructed a cultivator as follows:

1 represents a plow-beam provided with suitable handles, 2, attached to the beam 1 by nuts and bolts 3, and adjustably inclined by metallic brace-straps 4, connected thereto and to the beam 1 by nuts and bolts 5, adapted to engage one of the perforations 6 in the straps 4. The beam 1 is provided with a slot, 7, extending from its forward part through the curved portion 8 to the lower end thereof. By means of the slot 7 a plowshare, 9, may be adjustably secured to the plow-beam, as shown, by a bolt, 10, and nut 11, and a regulating-wheel and fender may also be adjustably secured thereto in front of the plowshare.

In the illustration here employed a wheel, 12, is mounted on an axle, 13, having its bearings in two V-shaped side frames, 14, connected by slotted cross-bars 15, provided with threaded ends passing through perforations 17 in the frames and engaged by nuts 16. The frames 14 are adjustable vertically on the cross-bars 15, being secured in any one of a series of perforations, 17. The frames 14 are suspended from the plow-beam 1 by means of bolts 18 engaging the slot 19 in the cross-bars 15, and passing through the plow-beam 1 and secured by a nut, 20. As shown in Fig. 4, the wheel 12 is suspended to the right of the plow-beam 1, adjacent to the plowshare 9. The wheel 12 is provided with an inner wheel having a rim, 21, spokes 22, and hub 23 movable on the axle of wheel 12, whereby the spaces between the spokes 12' of wheel 12 may be regulated to act as a fender.

The hub 23 of the inner wheel is held on the axle of wheel 12 by friction, so as to require force to turn it, and the construction of its spokes 22, as well as the spokes 12' of wheel 12, is such that the spokes 22 will be parallel with the spokes 12' when moved to that position with the inner wheel, or will lie over and lessen or close the spaces between spokes 12' upon turning the inner wheel. The inner wheel will be held in these adjusted positions by means of friction with the axle of wheel 12 and the earth regulated in its escape through fender-wheel 12, or entirely prevented from passing through. It is obvious that the inner wheel may be held in adjusted position by any suitable fastening, instead of by friction.

By means of the construction heretofore described the regulator-wheel may be adjusted longitudinally on the plow-beam to locate it in proper position with relation to the plowshare vertically to determine the depth to which the plowshare 9 shall cut, and also be adjusted laterally to serve as a fender, to prevent the crop being covered up by the earth thrown up by the plow.

To cultivate both sides of a row at once, two cultivators like the one described are bolted together. In lieu of the plowshare 9 a double-shovel plow may be attached, whereby onehalf of the middles between the rows may be plowed. Instead of the perforated braces being used, as heretofore described, slotted ones may be employed. If desired, the frames 14 may be detached from the plow-beam 1 and reversed, so that the wheel 12 may be adjusted laterally to the left of the plow-beam 1. The adjustment of the several parts will readily be seen, as it is only necessary to loosen the nuts and move the parts up or down or backward and forward to be in proper relative position.

With a cultivator constructed as hereinbefore described a young crop may be easily cultivated where the same work could not be done with an ordinary plow.

This device is especially useful in the cultivation of cotton, as it saves a great amount of hoeing, which has heretofore been necessary.

While I have described a particular construction of the parts, I do not intend to limit myself thereto, as the essential feature of my invention is a cultivator so constructed that either a single or a double plow may be used therewith, and a regulating-wheel and fender, which may be adjusted longitudinally, laterally, and vertically on the plow-beam.

By means of a plow-beam constructed as herein described a scraper may be readily attached to the front of the plow in any desired position. The guiding-handles of the plow can also be adjusted to the angle desired.

Having thus fully described my invention, I claim as new and desire to secure by Letters Patent—

1. The combination, with a plow-beam, of a frame consisting of side parts or hangers supporting an axle carrying a fender-wheel, and slotted cross-bars vertically adjustable in the side parts and adjustably clamped to the plow-beam, substantially as described.

2. A fender-wheel for cultivators, consisting of a wheel having an interior wheel with spokes adjustable, substantially as described, upon the axis of the outer wheel, whereby the spokes of the inner wheel may move over and regulate the spaces between the spokes of the outer wheel, substantially as described.

3. The combination, with the plow-beam 1, of the frame 14, having perforations 17, the supporting-wheel 12, slotted cross-bars 15, having nuts 16, the bolts 18, having nuts 20, and a plow adjustably secured to the plow-beam, substantially as described.

SAMUEL B. CUNNINGHAM.

Witnesses:
T. H. WAYLAND,
C. B. CALLISON.